J. WEST.
ENVELOP MACHINE.
APPLICATION FILED SEPT. 21, 1906.
1,043,278.
Patented Nov. 5, 1912.
14 SHEETS—SHEET 1.
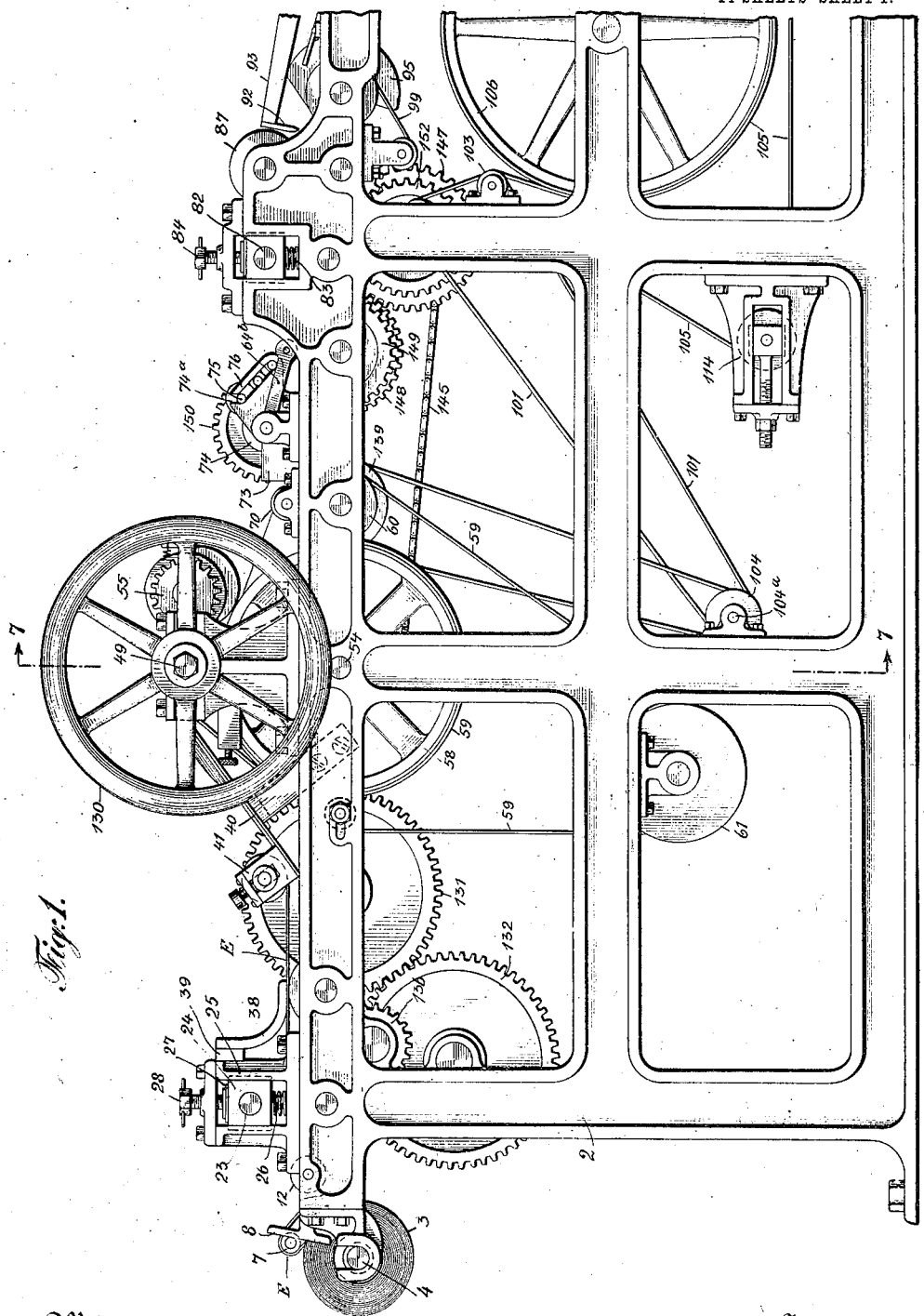

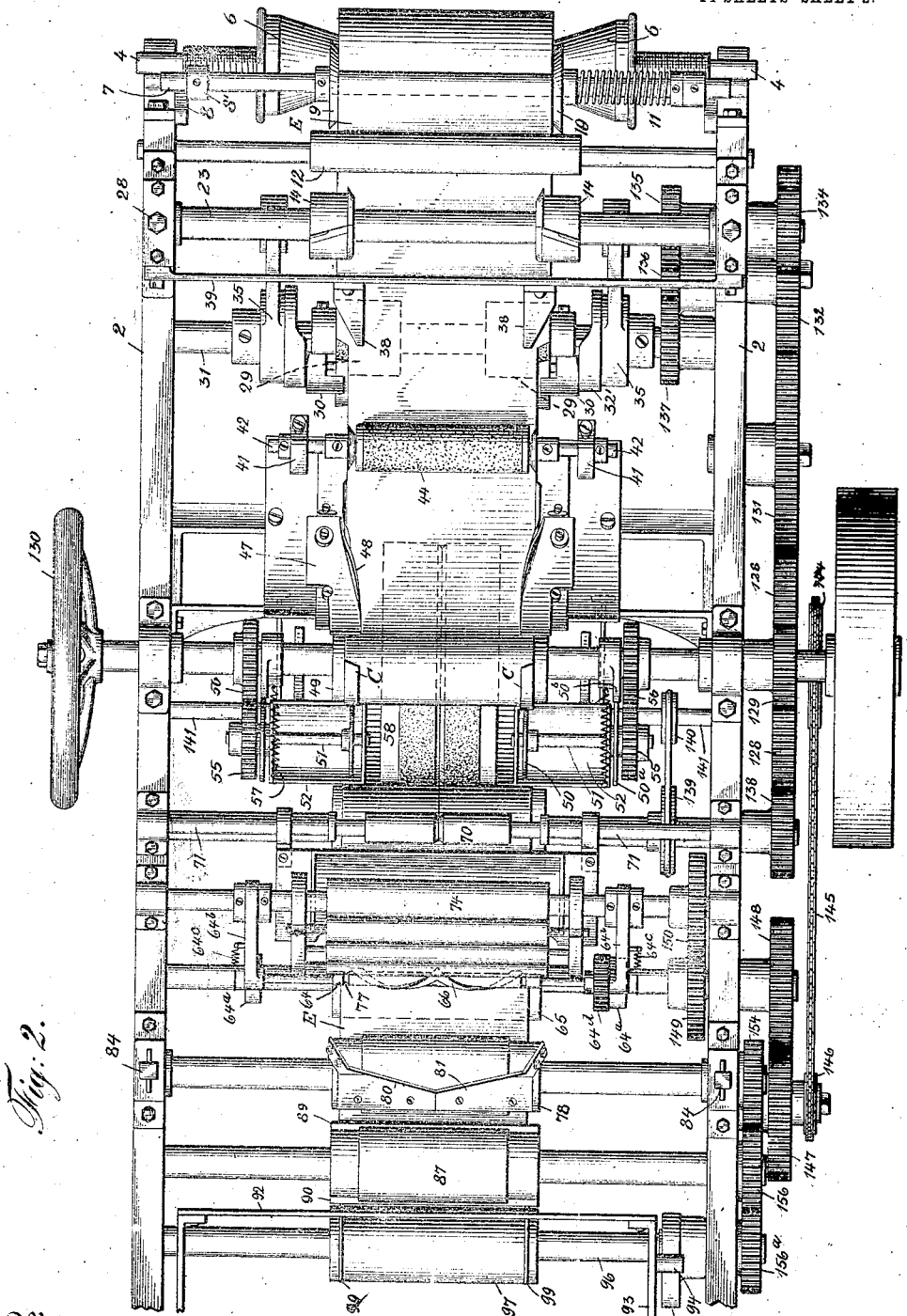

J. WEST.
ENVELOP MACHINE.
APPLICATION FILED SEPT. 21, 1906.
1,043,278.
Patented Nov. 5, 1912.
14 SHEETS—SHEET 3.
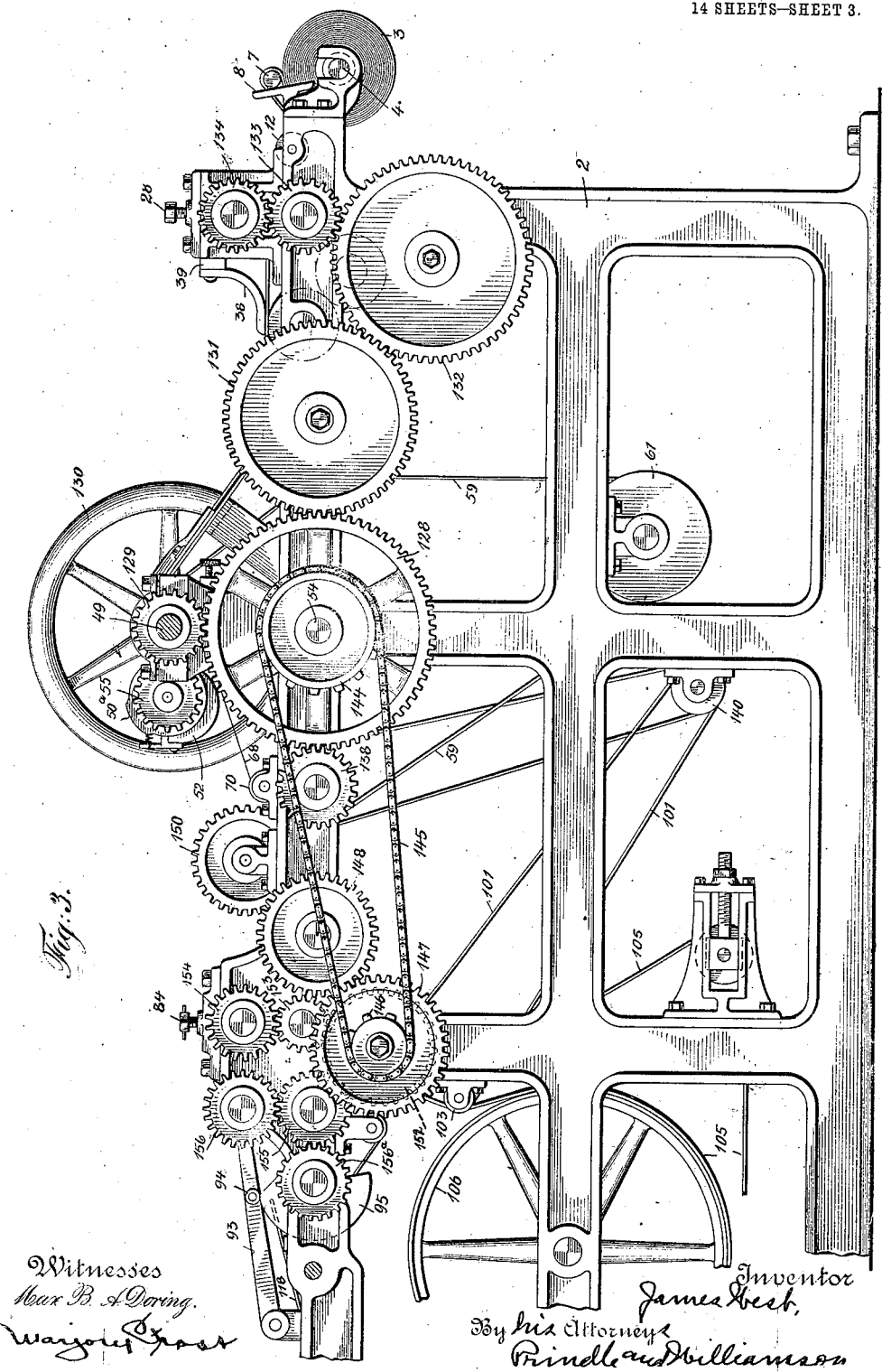

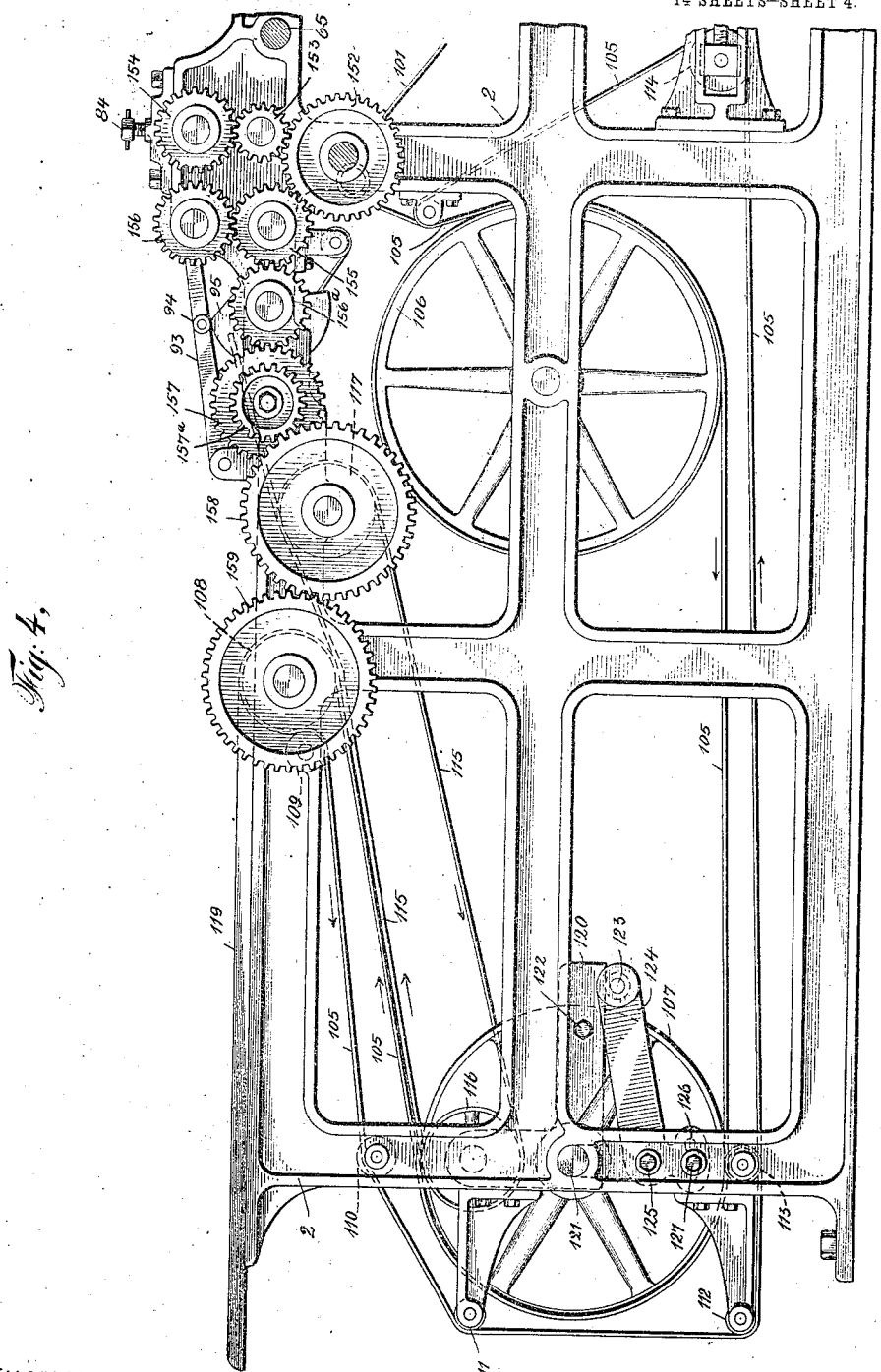

J. WEST.
ENVELOP MACHINE.
APPLICATION FILED SEPT. 21, 1906.

1,043,278.

Patented Nov. 5, 1912.
14 SHEETS—SHEET 5.

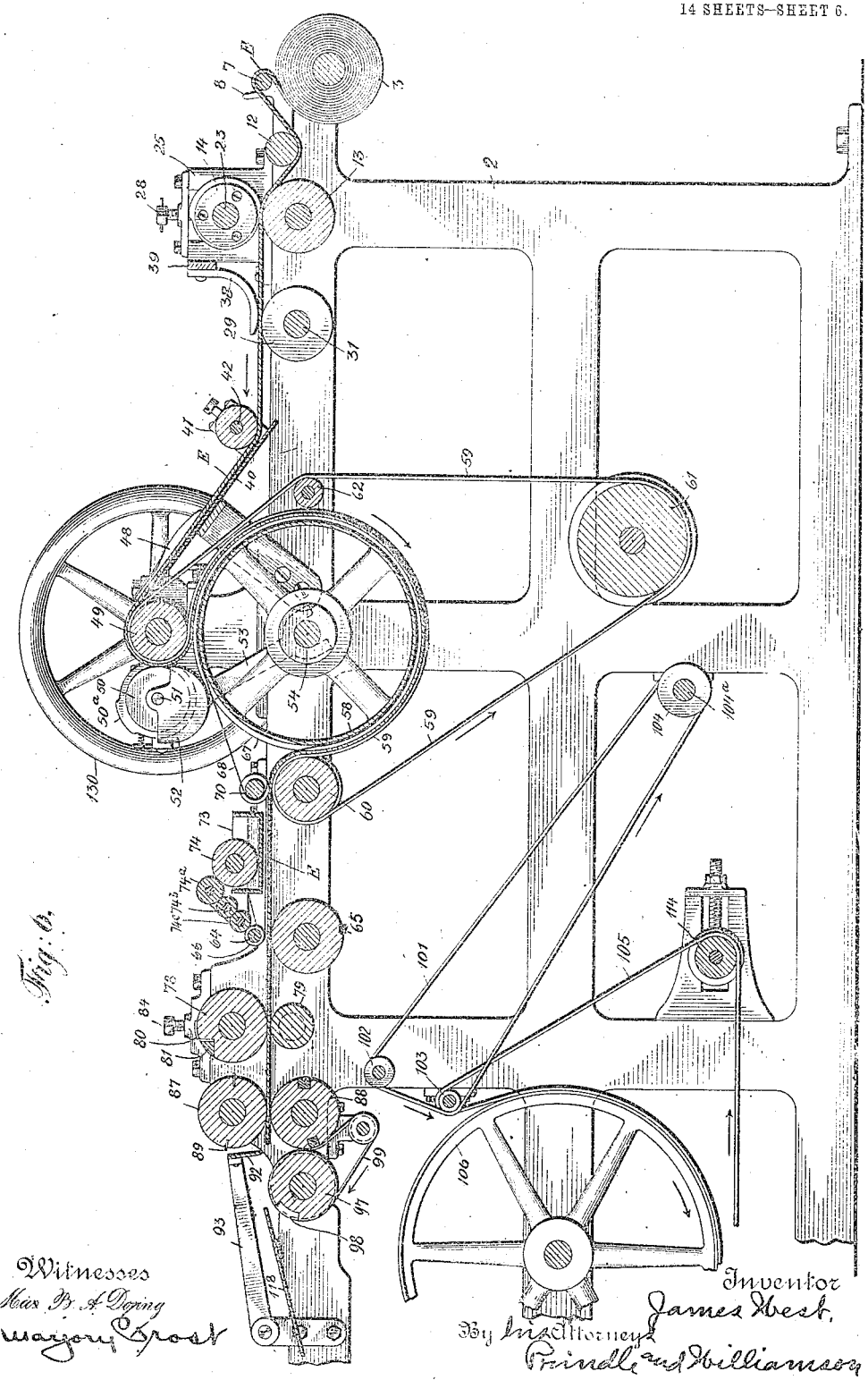

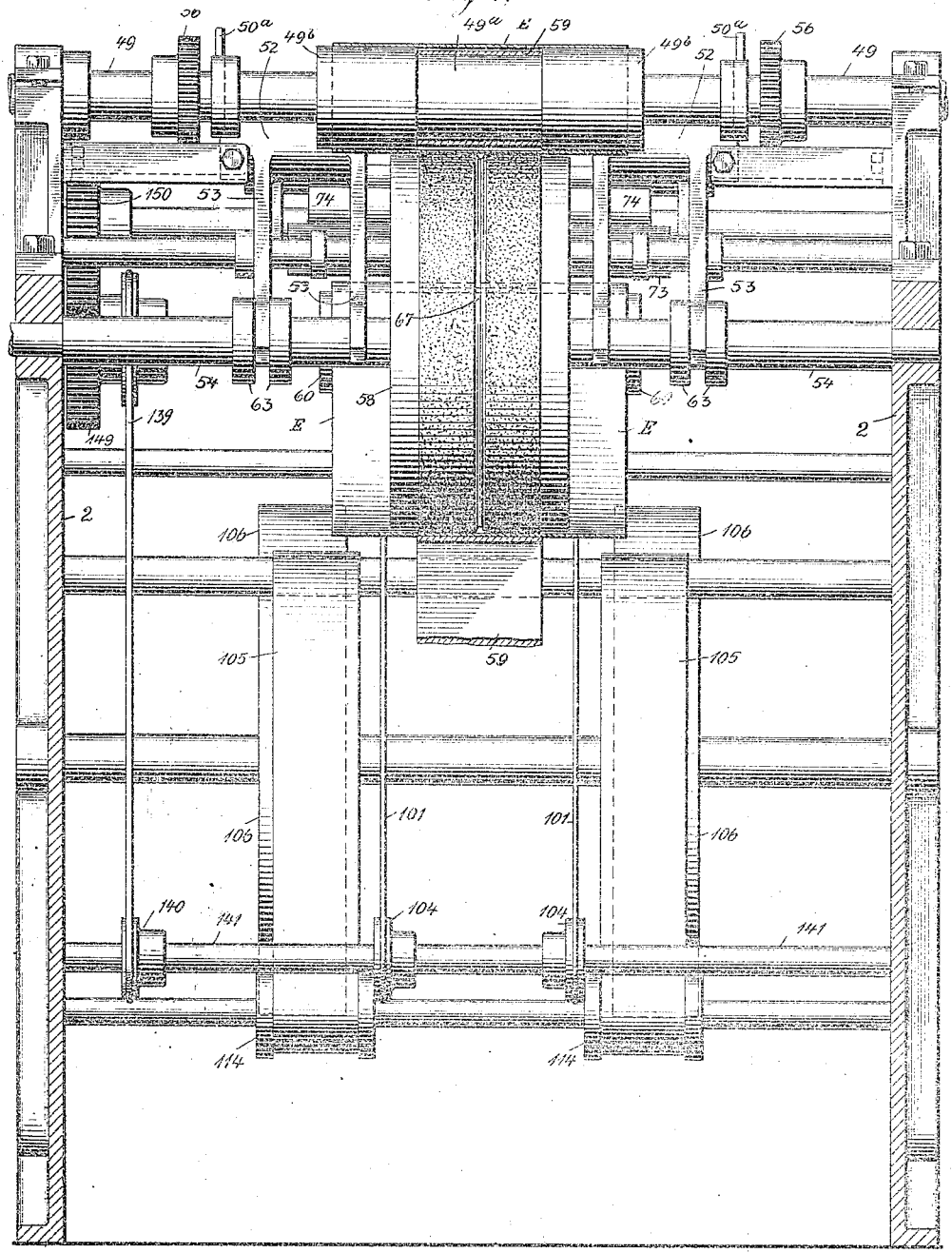

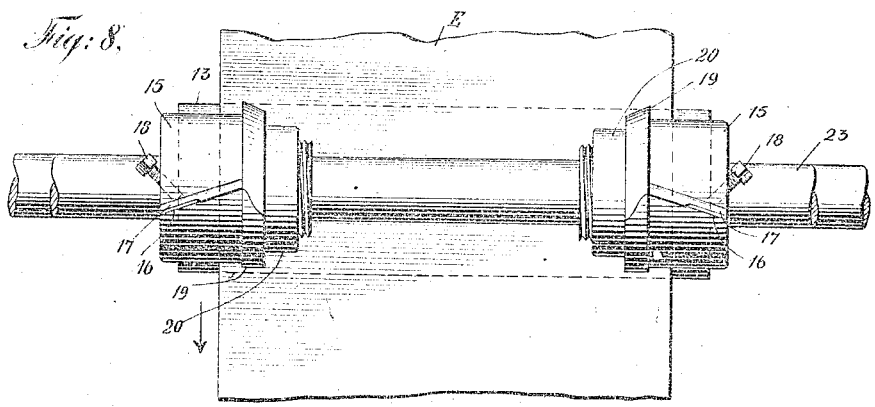
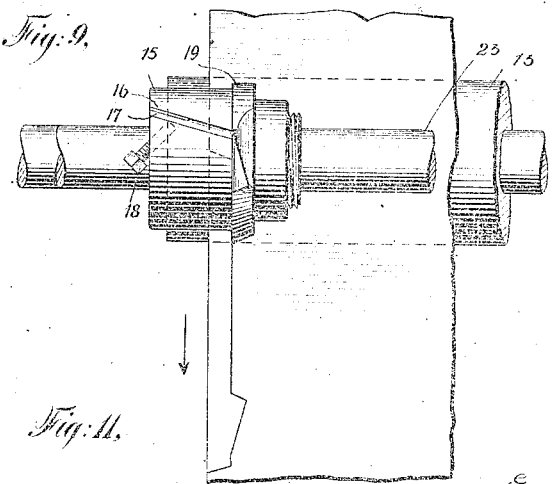
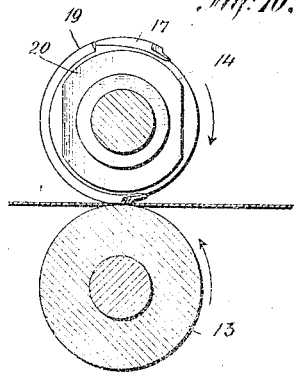
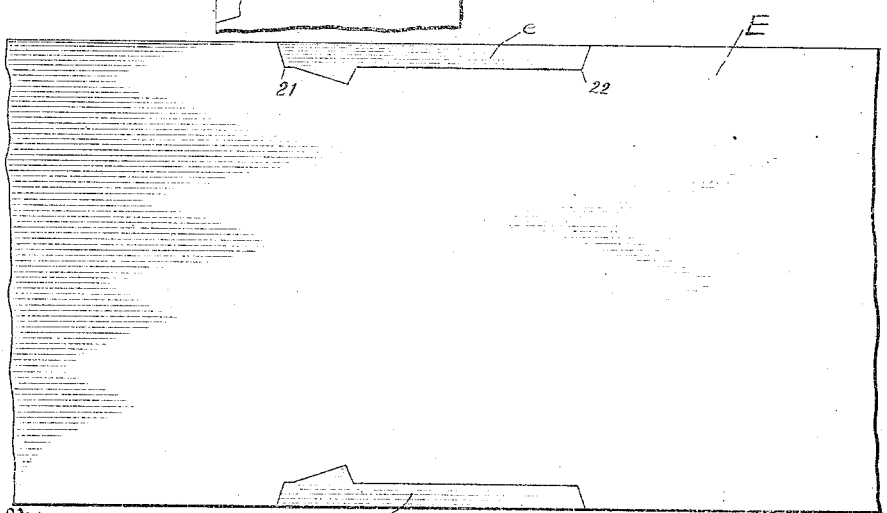

J. WEST.
ENVELOP MACHINE.
APPLICATION FILED SEPT. 21, 1906.
1,043,278. Patented Nov. 5, 1912.
14 SHEETS—SHEET 9.
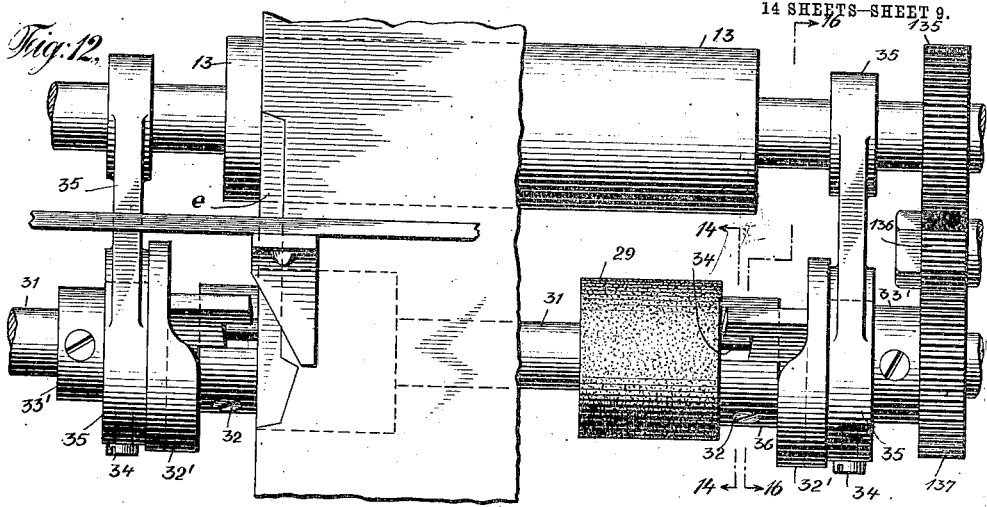
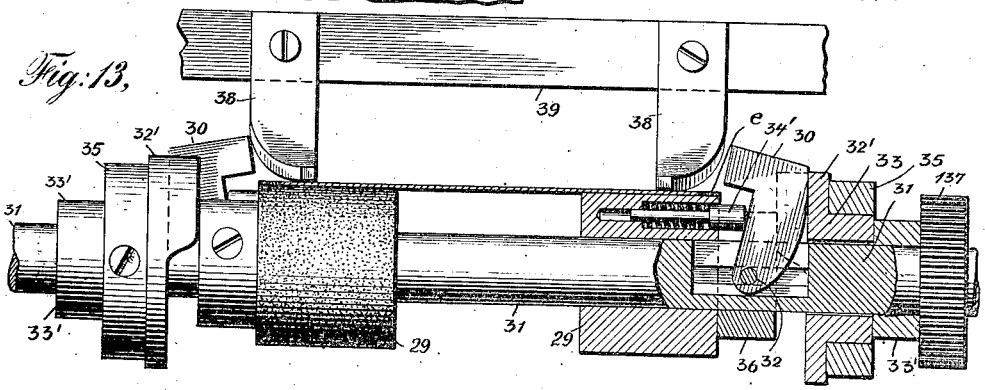
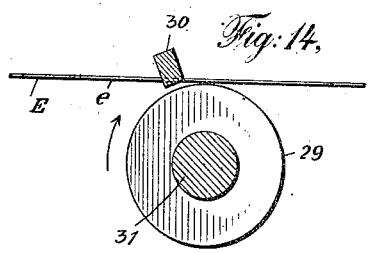
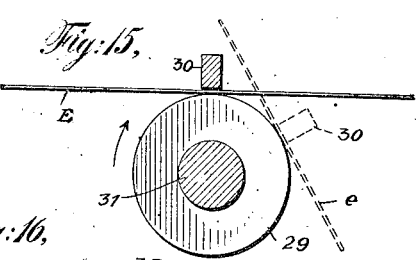
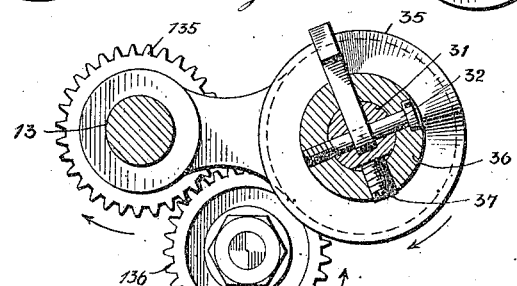
Witnesses
Inventor
James West
By his Attorneys
Prindle and Williamson J. WEST.
ENVELOP MACHINE.
APPLICATION FILED SEPT. 21, 1906.
1,043,278.
Patented Nov. 5, 1912.
14 SHEETS—SHEET 10.
Fig. 17.
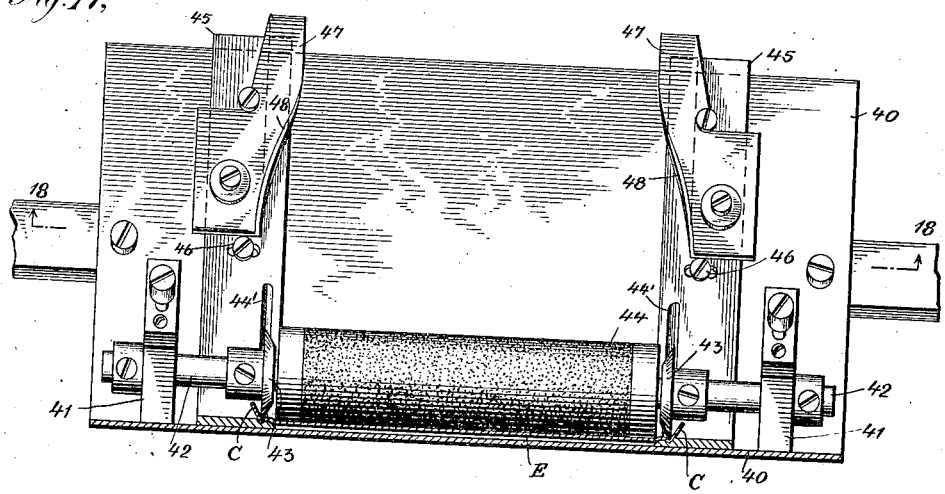
Fig. 18.
Fig. 19.
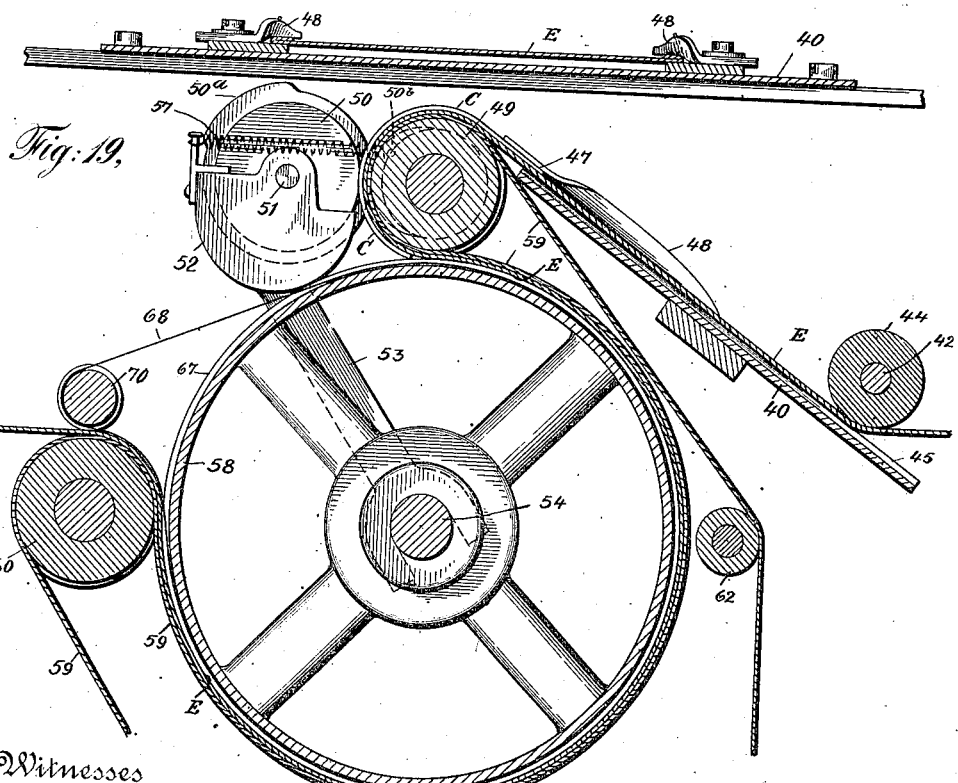
Witnesses
Max B. A. Doring
Wayous Frost
Inventor
James West,
By his Attorneys
Prindle and Williamson J. WEST.
ENVELOP MACHINE.
APPLICATION FILED SEPT. 21, 1906.
1,043,278.
Patented Nov. 5, 1912.
14 SHEETS—SHEET 11.
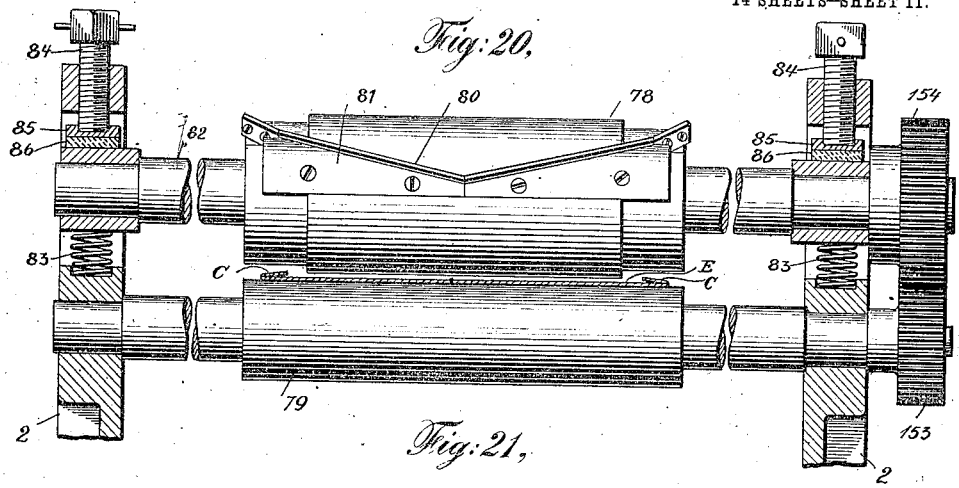
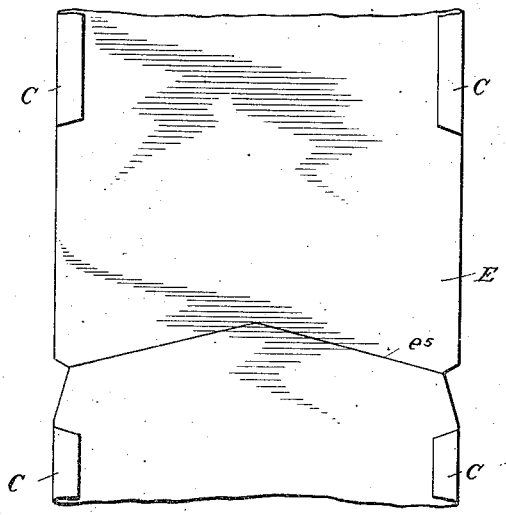
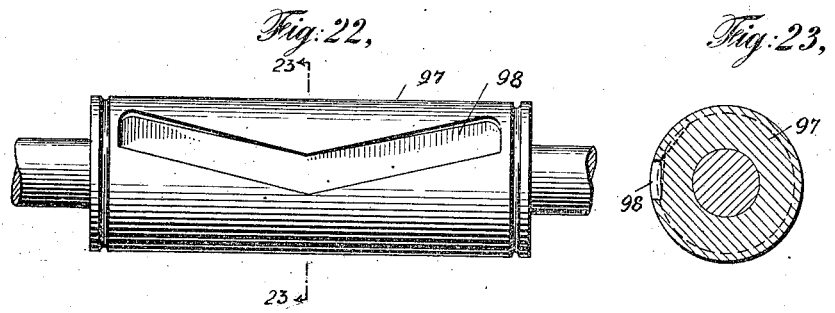

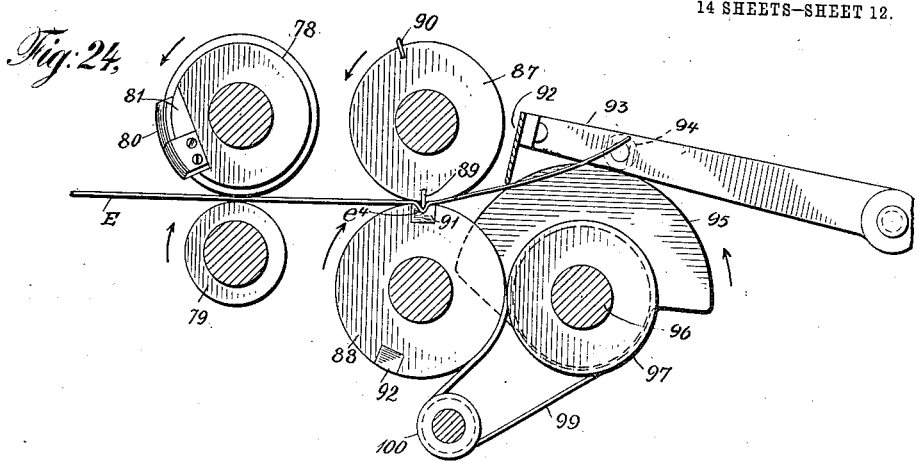
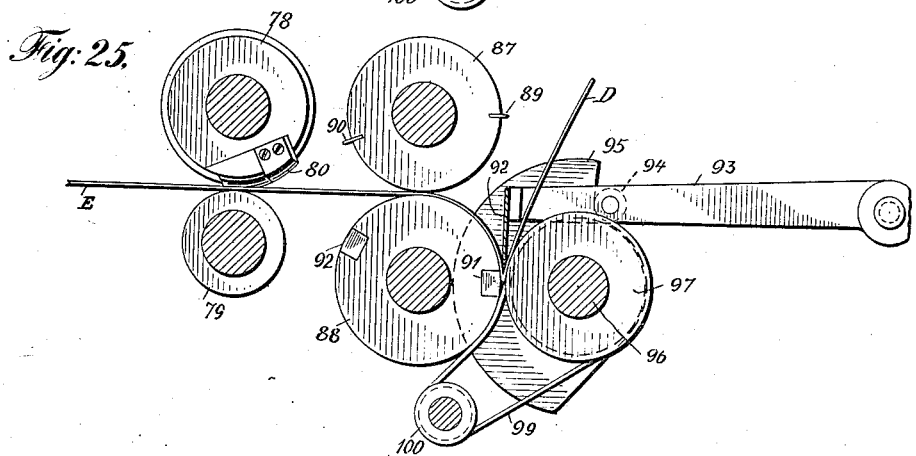
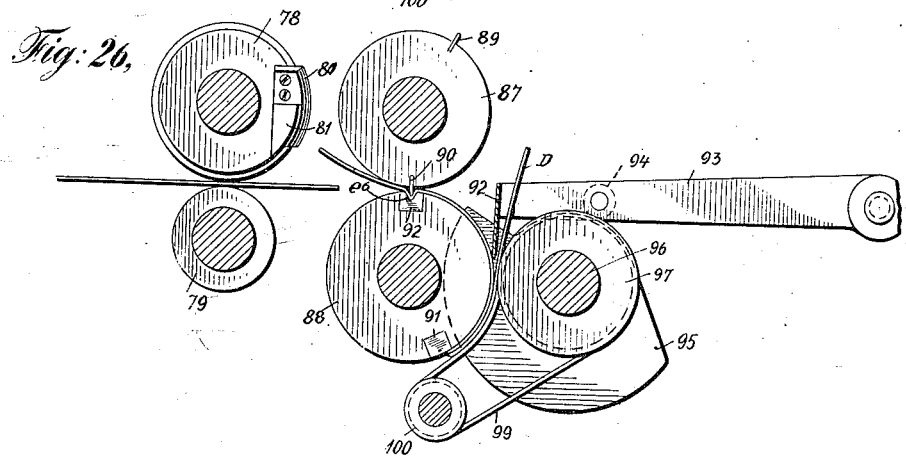

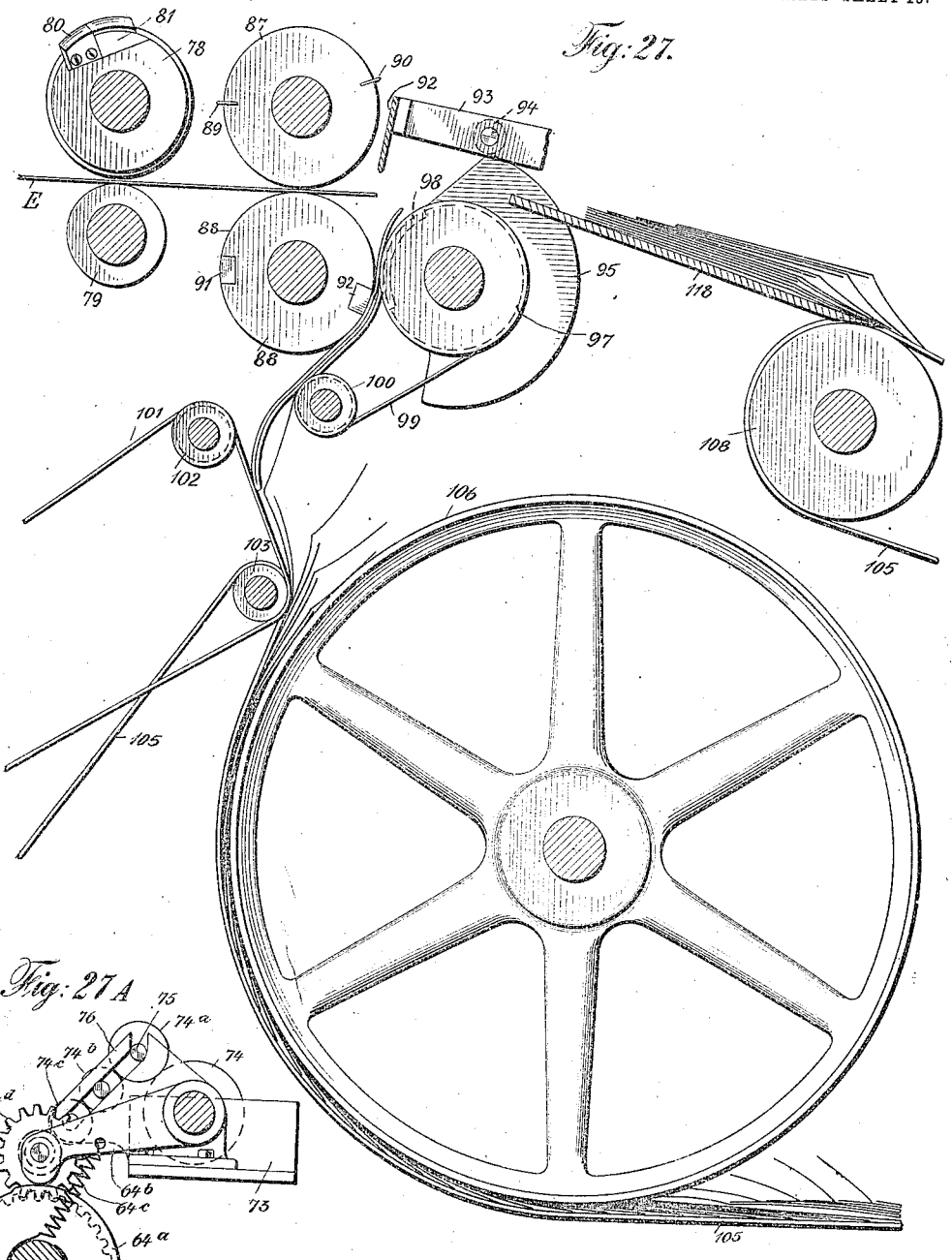

J. WEST.
ENVELOP MACHINE.
APPLICATION FILED SEPT. 21, 1906.
1,043,278.
Patented Nov. 5, 1912.
14 SHEETS—SHEET 14
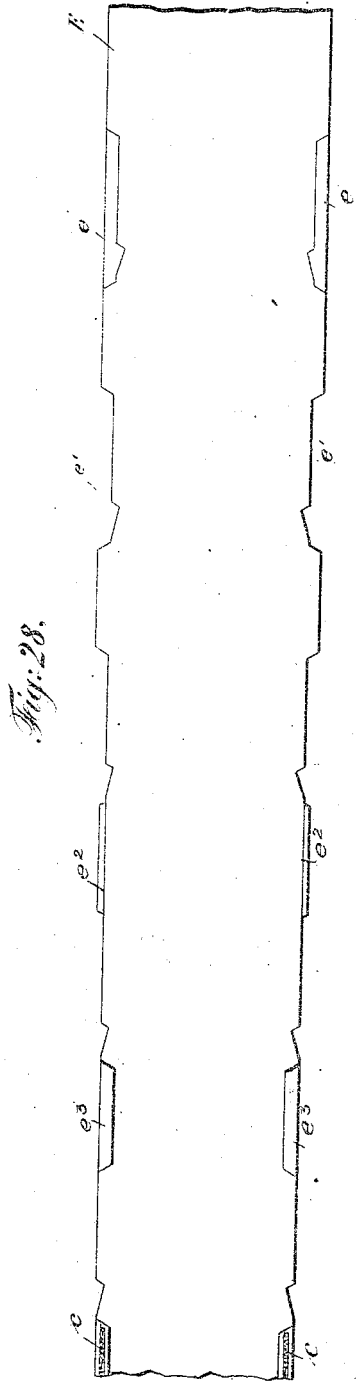
Fig. 28.
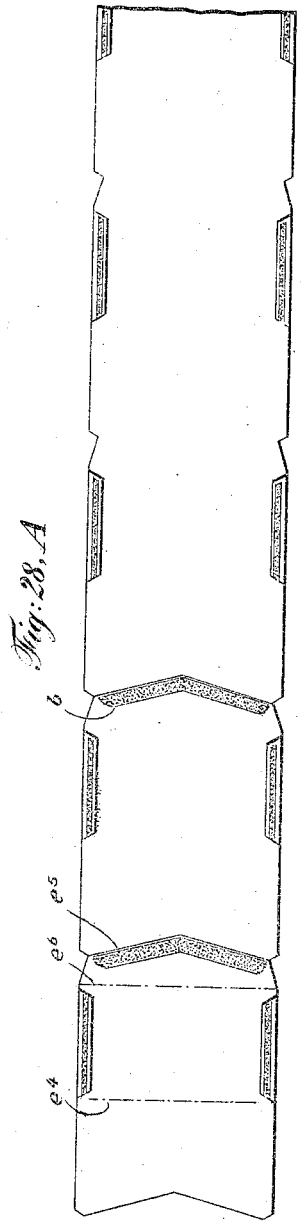
Fig. 28.A
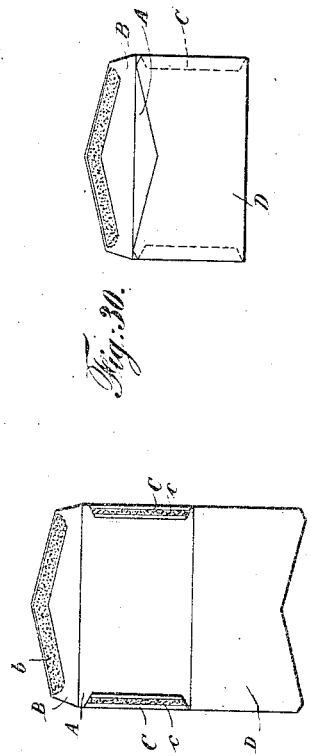
Fig. 30.
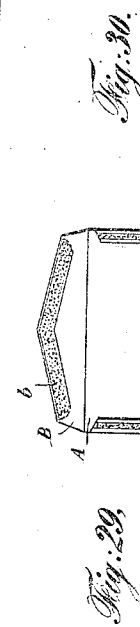
Fig. 29.
Witnesses
Max B. A. Doring
Marjory Frost
Inventor
James West
By his Attorneys
Prindle and Williamson

UNITED STATES PATENT OFFICE.

JAMES WEST, OF BROOKLYN, NEW YORK, ASSIGNOR, BY MESNE ASSIGNMENTS, TO ROBERT GAIR COMPANY, OF BROOKLYN, NEW YORK, A CORPORATION OF NEW YORK.

ENVELOP-MACHINE.

1,043,278.  Specification of Letters Patent.  Patented Nov. 5, 1912.

Application filed September 21, 1906. Serial No. 335,532.

*To all whom it may concern:*

Be it known that I, JAMES WEST, of Brooklyn, in the county of Kings, and in the State of New York, have invented a certain new and useful Improvement in Envelop-Machines, and do hereby declare that the following is a full, clear, and exact description thereof, reference being had to the accompanying drawing, in which—

Figure 1 is a side elevation of the first portion of my machine, in which the printing, cutting, pasting and folding of the envelop takes place. Fig. 2 is a top plan view of Fig. 1. Fig. 3 is a side elevation of the first portion of my machine taken from the opposite side of Fig. 1. Fig. 4 is a side elevation of the second portion of my machine in which the drying and delivering of the envelop takes place, portions of the folding and pasting device being also shown. Fig. 5 is a top plan view of Fig. 4 the table being partially broken away. Fig. 6 is a vertical longitudinal section of Figs. 1, 2 and 3 taken in the central plane. Fig. 7 is a vertical sectional view on an enlarged scale taken on the line 7 of Fig. 1, looking in the direction of the arrows. Figs. 8 and 9 are details on an enlarged scale of the device for cutting the side flaps, Fig. 8 showing the device in the starting position, and Fig. 9 in the finishing position. Fig. 10 is a vertical sectional view of Fig. 9. Fig. 11 is a plan view of the part of the strip of paper showing the cuts made by the device illustrated in Figs. 8 and 9. Fig. 12 is a plan view of a gripping device for removing the pieces cut out by the device in Fig. 8. Fig. 13 is a front elevation of Fig. 12 partly in section. Fig. 14 is a diagrammatical view of the gripping finger before catching the cut portion of the strip, being a section on the line 14 of Fig. 12. Fig. 15 is a view similar to Fig. 14, the gripping finger being shown as having gripped the cut-out portion of the strip, and in dotted line is shown the finger carrying cut-out portions of the strip. Fig. 16 is a section on the line 16 of Fig. 12. Fig. 17 is a plan view of the device for folding the side flaps of the envelop. Fig. 18 is a sectional view taken on the line 18 of Fig. 17. Fig. 19 is a side elevation in section showing the device for folding and pasting the side flaps, and for feeding the paper. Fig. 20 is a front elevation of the top flap cutting roll with its bearings. Fig. 21 illustrates the cut of the device in Fig. 20. Fig. 22 is a plan view of a roller for pressing the side seams of the envelop together. Fig. 23 is a cross-section of Fig. 22 on line 23. Fig. 24 is a cross-section of the cutting, folding and feeding rolls, and their coöperating parts at the moment of making the first crease in the envelop. Fig. 25 illustrates the parts in Fig. 24 at the moment of cutting the top flap and making the first fold in the envelop. Fig. 26 illustrates the parts in Fig. 24 at the moment of making the second crease in the envelop. Fig. 27 illustrates the parts in Fig. 24 in connection with the drying and delivering device. Fig. 27ª is a vertical section of a detail. Figs. 28 and 28ª represent a strip of paper showing the various successive operations thereon. Fig. 29 is a blank of the envelop as it appears before the back is folded over and secured. Fig. 30 is a view of the finished envelop.

The object of my invention has been to provide a machine for making envelops from a continuous strip of material, which machine shall have the advantages of rapidity and certainty of operation, and of producing envelops of good quality and at a low cost; and to such ends my invention consists of the envelop machine hereinafter specified.

The construction and operation of my machine will be more readily understood if prefaced by an explanation of the envelop which the machine is designed to make, although it is to be understood that the invention is applicable to the manufacture of other forms of envelop and that I have illustrated only one embodiment of my invention.

The envelop, as illustrated in Figs. 29 and 30, consists of a front A or body having on its upper edge a closing flap B, that has the usual strip of adhesive *b;* the front A also having side flaps C, which are narrow and which are provided on their backs with adhesive *c*, which adhesive may extend along the side edges of the back of the envelop.

At the lower edge of the front A, the back D of the envelop is formed. As illustrated in Fig. 30, the back D is secured by the adhesive $c$ to the side flaps C.

The steps of forming the envelop from the strip of material are illustrated in Figs. 28 and 28$^a$. The first operation is the cutting or the scoring of the strip E preparatory to removing the pieces $e$, whose removal results in the formation of the side edges of the closing flap, of the side edges of the front or body of the envelop, and of the side edges of the back of the envelop. The next step is the removal of the pieces $e$, as illustrated at $e'$, which step is followed by the formation of creases $e^2$ between the side flaps and the body of the envelop. The side flaps are then folded over on the body of the strip, as at $e^3$, after which the adhesive $c$ is applied to the side flaps. This is followed by the application of the adhesive $b$ for the closing flap of the envelop. The crease $e^4$ between the front and back of the envelop is then formed and the back is bent over preparatory to being secured to the side flaps. The score $e^5$ along the top edge of the closing flap, is then made and the crease $e^6$ between the front of the envelop and the closing flap is made, the formation of the said crease drawing the back of the envelop away from the body of the strip and causing the separation of the blank from the body of the strip along the score $e^5$.

In carrying my invention into practice, I provide a frame 1 of any desired construction. In the illustrated embodiment of my invention such frame consists of side frames 2, composed chiefly of vertical and horizontal bars cast in one piece, such side frames being connected by the various shafts of the machine, and also, if desired, by braces. The rod 4 is screw-threaded and opposing cones 6 are mounted thereon, the roll being seated on the said cones. The position of the roll can thus be adjusted laterally along the rod. The strip E passes from the roll around a rod 7 that lies upon the upper surface of the roll and rests against the forwardly and upwardly inclined edges of the plates 8 secured to the frame. The rod 7 has a collar 8' to prevent its lateral displacement, and it is provided with a disk or collar 9 that is adapted to bear against and guide one edge of the strip E, and also with an opposing disk or collar 10 that is yieldingly forced against the end of the roll and the edge of the paper by a spring 11 mounted on the said rod. The paper is "braked" by the sharp turn around the rod 7 so that it does not unwind too freely. After passing around the rod 7, the strip E passes under a roller 12 and then passes over a hardened roller 13, against which operate cutter rolls 14.

The rollers 13 and 14 are illustrated in detail in Figs. 9 and 10. Each cutter roll 14 is composite and consists of a cylindrical body 15, having two diagonal slots 16 formed therein, in each of which is mounted a knife 17, the latter being secured in their slots by set screws 18. Against the inner face of the body 15, a disk 19 is clamped by a nut 20. The disk 19 has formed on it a blunt cutting edge, and of a configuration corresponding to the line illustrated in Fig. 11 from the point 21 to the point 22. The oblique lines from the points 21 and 22 to the edges of the paper are cut by the knives 17. The shaft 23 of the rolls 14 is mounted in boxes 24 that are vertically movable in a bracket 25 mounted on a frame of the machine. Springs 26 are placed beneath the boxes to counter-balance the weight of the shaft and the rollers. On the upper ends of the boxes 24, strips or pieces of rubber 27 are placed and hand screws 28 bear on the said rubber or other yielding material or upon metal washers or disks seated thereon so that the cutting rolls are yieldingly pressed against the hardened roll 13. The action of the cutting rolls as thus constructed I have found in practice to be very advantageous. The rubber washers allow the cutting rolls to yield sufficiently so that the knives are not injured by running on the hardened roll, and I have found that they will last for a long time without sharpening. The springs beneath the boxes prevent the weight of the shaft and rollers from forcing the knives too hard against the hardened roller, and thus from causing any injury.

After being scored as illustrated in Fig. 11, the strip passes over rollers 29 which are provided with devices for removing the scored portions $e$ of the strip. (See Figs. 12 to 16.) The rollers 29 are preferably faced with emery cloth, or other roughened material, so that the paper will not slip upon the said rollers. At the outer side of each roller 29 a finger 30 is pivoted in a slot in the shaft 31 of said rollers, upon a pin 32, so that the said finger can over-lie the portion of the roller 29 which is occupied by the portions $e$ that are to be removed from the strip E. The fingers 30 are moved over to clamp the scored portions $e$ by a stationary cam 32' which is formed on a sleeve 33, the latter being secured by a screw 34 in a bracket 35. The bracket 35 also embraces the shaft of the hardened roll 13, so that the cam 32' is prevented from rotating with the shaft 31. The finger 30 is held against the cam by a spring-pressed bolt 34' mounted in the roller 29. In order that the fingers and rollers 29 may be adjusted for different widths of envelops, the pins 32 are mounted in grooves in the shaft 31, and the blocks 36 are secured in adjusted position by screws 37. The action of the fingers 30 is illustrated in Figs. 14, 15 and 16. As the fingers pass above the level of the strip as illustrated in Fig. 14, they are forced over to clamp the scored portions e against the rollers 29, and are held in this position as they rotate to the position illustrated in Fig. 15, thus carrying the scored portions e to the dotted position illustrated in said figure, after which the scored portions e are dropped.

The fingers 30, may, if desired, have rubber pads on the surfaces which contact with the scored portions e. In order to insure that the strip E will be kept down flat as it passes over the cylinders 29, guides 38 may be secured to any stationary part of the frame, and bear upon the upper surface of the said strip. I have illustrated the said guides as secured to a bar 39 that is secured to the brackets of the bearing of the shaft for the rollers 14. The cams 32' can be adjusted circumferentially in the brackets 35. Collars 33' may be placed back of the sleeves 33 to prevent their yielding or spreading. The strip E next passes to the mechanism for creasing the side flaps of the envelop. Such mechanism is illustrated in detail in Figs 2, 17, 18 and 19. It consists essentially of a plate 40 having adjustable bearings 41 upon it, in which is mounted a shaft 42 that carries creasing disks 43. The creasing disks are driven by a roller 44 that contacts with the upper surface of the strip E, the roller 44 preferably having emery cloth or other form of rough material on its face, so that it will be driven by the paper. In order more effectively to form the creases, the disks 43 run in grooves 44'. In order to prevent the inked surface of the paper in case it should be printed from coming in contact with the plate 40, the grooves 44' are formed in plates 45 that only extend under the paper a short distance inside of the creasing lines as illustrated in Fig. 17. The plates 45 are laterally adjustable, owing to their being secured to the plates 40 by screws 46 passing through slots in the said plates. After being creased, the side flaps C pass under folding plates 47, which have warped surfaces 48 that bend over the flaps C. Beyond the plate 40 is a roller 49 which serves as an impression roller for type disks 50 that print the strips of adhesive c upon the side flaps C of the envelop. The disks 50 are mounted on shafts 51 having bearing in the side walls of paste cups 52, the latter being formed on the upper ends of arms 53 that are forked to straddle the driving shaft 54 of the machine. Rollers 50ª are mounted on the shafts 51 to be periodically struck by cams 50ᵇ on the shaft of the roller 49 and thus the disks 50 are raised away from the paper when they come to the closing flap of the envelop. The shafts 51 are provided with gears 55 that mesh with gears 56 on the shaft of the roller 49. The paste-applying portions of the disks 50 rotate at the same speed as the speed of the strip E. Springs 57 serve to keep the disks 50 up to their work. The driving shaft is provided with a driving drum 58 whose face is preferably covered with emery cloth or is roughened in any other manner. A preferably soft belt 59 passes over the roller 49, around and under the driving drum 58 and around a guide roller 60 on the rear side of the driving drum, from whence the belt passes around a lower guide roller 61 and over a small roller 62 in front of the driving drum and thence back to the roller 49. The roller 49 is preferably sufficiently above the driving drum so that the belt 59 does not contact with the driving drum at this point, thus forming a flaring opening into which the end of the strip E can find easy entrance. I have found that the strip is gripped between the rough face of the driving drum and the belt 59 so firmly that the strip E can be driven to the point where the blanks are severed without any other feeding means. The forked ends of the arms 53 are received in grooves in collars 63 that are adjustable along the shaft 54 for making envelops of different widths.

For convenience in making envelops of different widths, I prefer to form the roller 49 in three parts: a central part 49ª of reduced diameter for the belt 59, and end sections 49ᵇ of full diameter that can be adjusted along their shaft. The gumming disks act against the paper that is over the hard surface of the sections 49ᵇ. From the driving drum, a strip E of paper passes between an upper roller 64 and a lower roller 65, the upper roller having a type 66 by which the strip of adhesive b is applied to the closing strip of the envelop. The type 66 extends through the full circumference of the roller 64, and the roller 64 is raised away from the paper while the body of the envelop passes under it, by a cam 64ª, which acts on the lever 64ᵇ in which the bearings of the roller 64 are formed. The lever 64ᵇ may be depressed by a spring 64ᶜ. The cam 64ª is mounted upon the shaft of the roller 65. The roller 64 is continuously driven by gear 64ᵈ meshing with gear 64ᵉ on shaft of the roller 65. In order to insure that the strip E will leave the driving drum and not wind itself around it, the driving drum is provided with a groove 67 in which runs an endless cord 68, which latter also passes around a grooved pulley or roller 70, that is mounted on a shaft 71, the pulley 70 being conveniently mounted over the idle roller 60 of the belt 59. The strip E is thus removed from the driving drum and carried well along with the felt belt before it is out of control of the cord 68. Adhesive is applied to the roller 64 by a roller 74 that is mounted in bearings on a gum-pan 73, there being a roller 74 running in the gum and rollers 74ª, 74ᵇ and 74ᶜ for transferring the gum from roller 74.

The means for applying adhesive to the type 66 may be of any desired construction, and I have therefore not shown such parts in detail. The roller 74ª may conveniently have its shaft 75 running in forked brackets 76, so that the rollers 74ᵇ will yieldingly rest upon the roller 74 and will yield to the type 66. The roller 64 is preferably provided with grooves 77 in the portions of its face where the strips of adhesive c on the side flaps come in contact with the surface of the cylinder. After passing between the rollers 64 and 65, the strip passes between a cutter-roller 78, and a hardened roller 79 for the purpose of forming the score $e^5$ along the top line of the closing flap. (See Fig. 20.) The roller 78 has a slot formed in it in which is mounted a knife 80 that is held up against the wall of the slot by a screw-fastened block 81. The cutter-roller 78 is, like the rollers 14, mounted upon a shaft 82, whose boxes are supported by springs 83 to counter-balance the weight of the shaft and roller, and are forced down by screws 84 that bear upon metal disks 85, between which and the bearing box, are interposed strips of rubber 86. From the cutter-roller, the strip E passes between rollers 87 and 88. The roller 87 has creasing blades 89 and 90 set in slots in its face, and the roller 88 has blocks of rubber 91 and 92, corresponding to the creasing blades 89 and 90, that are set in its face. The action of the creasing blades is to form the top and bottom creases $e^4$ and $e^6$ of the envelop. Their action is illustrated in detail in Figs. 24 to 27. As illustrated in Fig. 24, the creasing-blade 89 first forms the bottom crease $e^4$. The blank is then folded at such crease by a blade 92 that is carried by pivoted arms 93, the latter having a roller 94 that bears upon the cam 95, so that the arms 93 are oscillated, and the blade 92 is carried up and down. The shaft 96 upon which the cams 95 are mounted, is provided with a roller 97 that bears against the roller 88. When the blade 92 descends it folds the blank along the crease $e^4$ and starts it between the rollers 88 and 97 as illustrated in Fig. 25. These rollers press the blank along the said crease and fully complete the folding. The blade 90 then forms the top crease $e^6$ as illustrated in Fig. 26, and such action draws the blank away from the strip E and severs it from the strip along the score $e^5$ as illustrated in Fig. 26. In order to prevent the adhesive on the closing flap from being injured by contact with the surface of the roller 97, such roller may, as illustrated in Figs. 22, 23 and 27 be cut away at 98.

The rollers 88 and 97 also press the back D of the envelop against the side flaps C and secure them thereto.

The envelop is now complete and ready to be dried and delivered in such form that they can be conveniently put up in packages. For this purpose the following construction is provided: A pair of cords 99 passes about the roller 97, being laid in grooves in its surface, and around a roller 100 that is beneath the roller 88 and such cords direct the envelop downward and forward against a similar pair of endless cords 101 that pass around upper and lower rollers 102 and 103 and rollers 104 on a shaft 104ª. The cords 101 direct the envelop between a pair of leather belts 105 and a pulley 106. The belts 105 pass over a pulley 108 and thence pass under the pulley 106 and horizontally rearward and around a second large pulley 107, and thence forward and around an upper pulley 108, thence rearward and under a guide-pulley 109, and over stationary guide-pulleys 110, 111, and 112, and from thence it passes under flanged guide-pulleys 113 and over an adjustable pulley 114 and back to the pulley 106. The belts 105 run slower than the strip of paper E, and thus the envelops are crowded together, over-lapping each other, as illustrated in Fig. 27. The envelops are carried by the belts 105 under the pulleys 106 and 107, and up over a pair of round belts 115 that run around pulleys 116 and 117 and enter slots in a plate 118. The belts 105 deposit the envelops upon the belts 115, and the latter carry them up and deposit them upon the inclined plate 118. The envelops are taken by hand from the plate 118 and counted and put up in bundles on the table 119. I prefer to fold the closing flaps of the envelops of an entire bundle over together at a single operation instead of folding each one over on its own envelop, since the flaps of the entire bundle can be opened by a single movement ready to put in the contents. In order to raise and lower the round belts 115 so as to adjust their relation to the belts 105 to enable the envelops to be deposited most efficiently on the belts 115, I mount the shaft of the pulley 116 in bell-crank-levers 120, such levers being mounted upon the shaft 121 of the pulley 107 by downwardly opening slots formed in the said levers. The levers 120 are connected for strength by a bolt 122. The horizontal arms of the levers 120 rest on a cross-bar 123 carried by the arms 124 of bell-cranks that are pivoted upon bolts 125 on the frame. The levers 124 each have an arc-shaped slot 126 through which passes a bolt 127, that serves to clamp the bell-cranks in any desired position.

The various parts of the machine are driven by the following means: Power is applied to the shaft of the roller 49, and such shaft is provided with a pinion 129 that meshes with a gear wheel 128 on the shaft 54. The shaft of the roller 49 is also provided with a hand-wheel 130 by which the machine may be turned by hand in starting the paper through the machine. The gear 128 meshes with an idler 131 that meshes with another idler 132, which is geared with a pinion 133 on the shaft of the roller 13. The roller 14 is driven from the shaft of the roller 13 by a pinion 134. The shaft of the roller 13 carries a gear 135 that meshes with an idler 136, which meshes with a gear 137 on the shaft 31. The shaft of the roller 60 carries the pinion 138 that meshes with the gear 128. Such shaft also carries a belt-pulley 139 whose round belt runs over a pulley 140 on the shaft 141, that carries the pulleys 104 by which belts 101 are driven. The shaft 54 has a sprocket-wheel 144 whose chain 145 drives a sprocket-wheel 146, the latter being connected with a gear 147. The gear 147 drives a gear 148 that is keyed on the shaft of the roller 65, which shaft also has a pinion 149 that meshes with the pinion 150 to drive the roller 74. The shaft 65 has a pinion 64$^a$ that meshes with a gear 64$^d$ on the shaft of the roller 64. A pinion 152 is fastened to the gear 147 and drives the roller 79 by a pinion 153 which, in turn, drives the roller 78 by a gear 154. The gear 152 also drives the roller 88 by a gear 155, which latter gear meshes with a gear 156 on the shaft of the roller 87. The gear 155 also drives the shaft of the roller 97 and cams 95 by a gear 156$^a$. The gear 156$^a$ meshes with gear 157, carrying a gear 157$^a$, meshing with a gear 158 on the shaft of the pulley 117, and the gear 158 meshes with a gear 159 on the shaft of the pulley 108.

The operation of my machine has been stated as the construction has been explained. It may, however, be summarized as follows:—The strip of paper first passes between the rollers 13 and 14, and a scoring is made preparatory to the removal of the pieces. These pieces are then removed by fingers 30 and rollers 29 and the side creases of the envelop are made by the creasing disks 43. The side flaps C are then folded over by the warped plates 47; the lines of adhesive $c$ are then applied to the side flaps C by the disks 50, and the strip passes around the driving drum and between the rollers 64 and 65 where the adhesive $b$ is applied to the closing flaps. The scoring $e^5$ to form the top edge of the closing flap is next made by the rollers 78 and 79, and the bottom crease is then made by the blade 89. The back of the envelop is then folded by the blade 92. The top crease of the envelop is then formed by the blade 90, and the blank is severed from the strip E. At the same time the back of the envelop is secured to the side flaps C, and the envelop is delivered by cords 99 and cords 101 between the belts 105 and the pulley 106. The belts 105 operating with pulleys 106 and 107, deliver the completed envelop upon the round belts 115, and they, in turn, deliver them upon the inclined plate 118. The envelops are then separated by hand into proper quantities to form a bundle, and all of the flaps of a single bundle are turned down at one time on the back of the last envelop of the bundle, and they are secured as by a band for sale.

It is obvious that various changes can be made in the above embodiment of my invention which will be within the spirit of my invention.

The cutting mechanisms illustrated in this case are not claimed herein, but are claimed in a separate application for patent Serial No. 382,704, filed July 8, 1907.

I claim:

1. In an envelop machine, the combination of means for creasing the edges of a strip of paper to form flaps for an envelop, a roller over which said strip is adapted to travel, and fingers mounted on said roller and adapted to clamp the creased parts of the strip against said roller and to carry them around with said roller to detach them.

2. In an envelop machine, the combination of means for creasing the edges of a strip of paper to form flaps for an envelop, a roughened roller over which said strip is adapted to travel, and fingers adapted to clamp the creased parts of the strip against said roller and to follow said creased parts around with said roller to detach them.

3. In an envelop machine, the combination of means for creasing the edges of a strip of paper to form flaps for an envelop, a roller over which said strip is adapted to travel, and fingers adapted to clamp the creased parts of the strip against an unyielding part of said roller and to follow said creased parts around with said roller to detach them.

4. In an envelop machine, the combination of means for creasing a strip of paper to form flaps for an envelop, a roller over which said strip is adapted to pass, a finger pivoted to said roller, and a stationary cam against which said finger is adapted to ride, which cam is adapted to force said finger to grip a scored portion against said roller.

5. In an envelop machine, the combination of means for creasing a strip of paper to form flaps for an envelop, a roller over which said strip is adapted to pass, a finger pivoted to said roller, a stationary cam against which said finger is adapted to ride, to force it to grip a scored portion against said roller, and a spring adapted to retract said finger.

6. In an envelop machine the combination of a frame, means for creasing a strip of paper to form flaps of an envelop, a shaft having bearings in said frame, two rollers on said shaft over which said paper is adapted to pass, fingers pivoted to said rollers, cams adapted to force said fingers to grip said paper, and arms to which said cams are secured, said arms, rollers and fingers being adjustable along said shaft to operate upon strips of different width.

7. In an envelop machine, the combination of a frame, means for creasing a strip of paper to form flaps of an envelop, a shaft having bearings in said frame, two rollers on said shaft over which said strip is adapted to pass, a finger pivoted to each of said rollers, a cam adapted to force each of said fingers to grip said paper against said rollers, and arms to which said cams are secured, said arms, rollers and fingers being adjustable along said shaft to operate upon strips of different width, said arms having openings that are adapted to receive an adjacent shaft in the machine.

8. In an envelop machine, the combination of means for creasing a strip of paper, a roller over which said strip is adapted to travel, a shaft upon which said roller is mounted, said roller being adjustable along said shaft, a collar mounted on said shaft, a pivot pin passing through said collar and through a longitudinal slot in said shaft, a finger mounted on said pin in a second longitudinal slot in said shaft, a cam mounted on said shaft and adapted to operate said finger, said cam having a hub and an arm adapted to receive said hub, said arm having an opening that is adapted to receive a parallel shaft.

9. In an envelop machine, the combination of means for forming flaps on the edges of a strip of paper, means for forming creases, preparatory to turning said flaps, said creasing means consisting of a shaft having a roughened roller, against which said strip is adapted to press so that the movement of said strip shall rotate said shaft, said shaft having disks with sharpened edges that are adapted to bear on the paper and crease it.

10. In an envelop machine, the combination of means for forming flaps on the edges of a strip of paper, and means for forming creases preparatory to turning said flaps, said creasing means consisting of a shaft having a roughened roller against which said strip is adapted to press to rotate said shaft, said shaft having disks with sharpened edges that are adapted to bear against the paper and crease it, and plates having grooves in which said disks are adapted to act.

11. In an envelop machine, the combination of means for forming flaps on the edges of a strip of paper, and means for forming creases preparatory to turning said flaps, said creasing means consisting of a shaft having a roughened roller under which said strip is adapted to pass, said shaft having disks with sharpened edges that are adapted to bear on the paper and crease it, and plates having grooves in which said disks are adapted to act, said plates being mounted upon a base-plate so that the paper does not touch the base-plate 12. In an envelop machine, the combination of means for forming flaps on the edges of a strip of paper, means for forming creases at the bases of said flaps, said means for creasing consisting of disks and grooved plates against which said disks are adapted to act, there being a space formed beneath the body of the strip of paper between said plates and warped guides on said plates, adapted to turn said flaps.

13. In an envelop machine adapted to operate upon a strip of paper, the combination of a driving drum, a belt, guide pulleys adapted to cause said belt to pass around a considerable portion of the circumference of said drum, and a cord adapted to travel in a groove in said drum, said cord passing around a pulley that causes it to travel with the belt after the latter leaves the drum, whereby the strip is prevented from winding itself around the drum.

14. In an envelop machine, the combination of means for shaping the front edge of a strip of paper to form one of the top or bottom flaps of an envelop, means for forming transverse creases in the blank, comprising a roller, a second roller close to said first mentioned roller, a blade adapted to tuck one of said creases between said rollers, and guiding cords carried by one of the rollers.

15. In an envelop machine, the combination of a roller having a creasing blade, a roller having a yielding surface adapted to co-act with said creasing blade, a roller adjacent to said last mentioned roller, and a reciprocating blade adapted to strike a blank along one of said creases and force it between the two last mentioned rollers.

16. In an envelop machine, the combination of a roller having creasing blades, a roller having a yielding surface adapted to co-act with said creasing blades, a roller adjacent to said last mentioned roller, a reciprocating blade adapted to strike the blank along one of its creases and force it between said second and third rollers, and a cutter adapted to sever the blank from said strip, said blade being mounted upon levers, and a rotating cam adapted to raise said levers and with them said blade.

17. In an envelop machine, the combination of means for forming an envelop and for applying adhesive thereto, and folding the flaps thereof, and means for retaining said envelops in pasted condition, and for delivering them upon a table, said last mentioned means consisting of a pulley near the surface of said table, a belt running around said pulley, a guide pulley adapted to lead said belt to a point where it can receive the completed envelop, pulleys outside of and bearing against said belt, the envelops being received between one of the said pulleys and said belt, said last mentioned pulley causing the belt to travel horizontally and carry upon its upper surface the envelops, and a second belt adapted to bear against the under surface of the delivery end of the said first mentioned belt to receive said envelops, said last mentioned belt running close to the surface of the table, to deliver the envelops thereupon.

In testimony that I claim the foregoing I have hereunto set my hand.

JAMES WEST.

Witnesses:
B. MARCUSE,
EDWIN J. PRINDLE.